United States Patent [19]

Lupke

[11] Patent Number: 4,555,230
[45] Date of Patent: Nov. 26, 1985

[54] CALIBRATOR FOR USE IN THE MANUFACTURE OF DOUBLE WALLED THERMOPLASTIC PIPE

[76] Inventor: Manfred A. A. Lupke, 10 McLeary Ct., Concord, Ontario, Canada, L4K 2Z3

[21] Appl. No.: 587,139

[22] Filed: Mar. 7, 1984

[30] Foreign Application Priority Data

May 27, 1983 [CA] Canada .................................. 429064

[51] Int. Cl.4 ........................ B29C 53/00; B29C 53/56
[52] U.S. Cl. .................................... 425/325; 264/313; 264/508; 425/326.1; 425/381; 425/393; 425/466; 425/DIG. 14
[58] Field of Search ............... 425/380, 381, 403, 466, 425/467, DIG. 14, DIG. 16, 532, 325, 326.1, 393, 396; 264/313, 508

[56] References Cited

U.S. PATENT DOCUMENTS

| | | | |
|---|---|---|---|
| 3,247,548 | 4/1966 | Fields et al. | 264/313 |
| 3,538,209 | 11/1970 | Hegler | 425/380 |
| 3,976,414 | 8/1976 | Hegler et al. | 425/381 |
| 4,226,580 | 10/1980 | Lupke et al. | 425/504 |
| 4,233,020 | 11/1980 | Oswald | 425/DIG. 14 |
| 4,352,470 | 10/1982 | Blakeslee | 242/72.1 |
| 4,510,013 | 4/1985 | Lupke et al. | 425/393 |

FOREIGN PATENT DOCUMENTS

| | | |
|---|---|---|
| 81298 | 6/1983 | European Pat. Off. . |
| 1076985 | 7/1967 | United Kingdom . |
| 1439294 | 6/1976 | United Kingdom . |

Primary Examiner—Jay H. Woo
Assistant Examiner—Timothy W. Heitbrink

[57] ABSTRACT

In an apparatus such as a corrugator for manufacturing thermoplastic pipe with a corrugated outer wall and a smooth inner wall, a calibrator is employed to provide a smoother inner wall and a more rapid inner wall cooling. The calibrator includes a tube wound into a helical coil and an adjustment mechanism for adjusting the coil diameter. A cooling fluid may be passed through the tube.

1 Claim, 5 Drawing Figures

CALIBRATOR FOR USE IN THE MANUFACTURE OF DOUBLE WALLED THERMOPLASTIC PIPE

The present invention relates to an apparatus for manufacturing thermoplastic pipe with a corrugated outer wall and a smooth inner wall. The apparatus includes a travelling mold cavity of corrugated form, means for forming the corrugated outer wall in the mold cavity and for extruding the inner wall into the outer wall, and presser means for pressing the inner wall against the bases of the corrugations of the outer wall.

An apparatus of this type is disclosed in Canadian Patent Application No. 405,321, filed June 16, 1982 by Manfred A. A. Lupke et al. In that application, the presser means is a mandrel or plug with a transversly ribbed, cooled surface. In one embodiment, the presser includes a tube wound into a helical coil to provide both the ribs and a passage for a cooling fluid. The apparatus is also equipped with a system for cooling the inside of the pipe with chilled air.

The present invention aims at the provision of a more rapid pipe cooling, so as to allow a higher production rate.

According to the present invention, an apparatus of the aforesaid type is characterized by a calibrator engaging the inside of the inner wall downstream of the presser means, the calibrator comprising a tube wound into a helical coil, means for passing a cooling fluid through the tube and means for adjusting the diameter of the coil.

The calibrating coil serves to cool and set the inner wall while engaging its inner surface to assist in controlling the final configuration of the inner wall. Adjustment of the coil diameter accounts for wall thickness, shrinkage and other variable factors that arise in the production of thermoplastic pipe so that such defects as streak marks on the inside of the pipe can be substantially reduced or avoided.

In one embodiment of the calibrator, the coil diameter adjustment means operate to twist one end of the coil about the coil axis, thus "winding-up" or "unwinding" the coil to change its diameter. An adjustment means of this sort may include a carrier extending along the center of the coil and fixed to one end of the coil. The other end of the coil may be secured to the carrier at a plurality of angular positions about the coil axis.

In another embodiment of the invention, the calibrator includes a coil carrier consisting of several elongate support elements spaced around the inside of the coil and a mechanism for adjusting the radial distance of the support elements from the coil axis. The adjustment mechanism may include a core extending along the coil axis and a pair of plugs mounted on the core at spaced positions. Each plug has a tapering face confronting the other plug and engaging the support elements. The spacing of the plugs from one another can be adjusted so that the support elements will move along the tapered faces of the plugs to provide a reduced or increased diameter.

The coil carrier may be constructed with a helical groove to carry and support the coil, so as to resist any forces from the pipe tending to draw the coil downstream. The coil carrier may be mounted for limited floating movement inside the inner pipe, to provide a self centering action.

Plural calibrators of any of the above described types may be arranged in tandem along the mold cavity.

In the accompanying drawings, which illustrate exemplary embodiments of the present invention:

Figure 1:
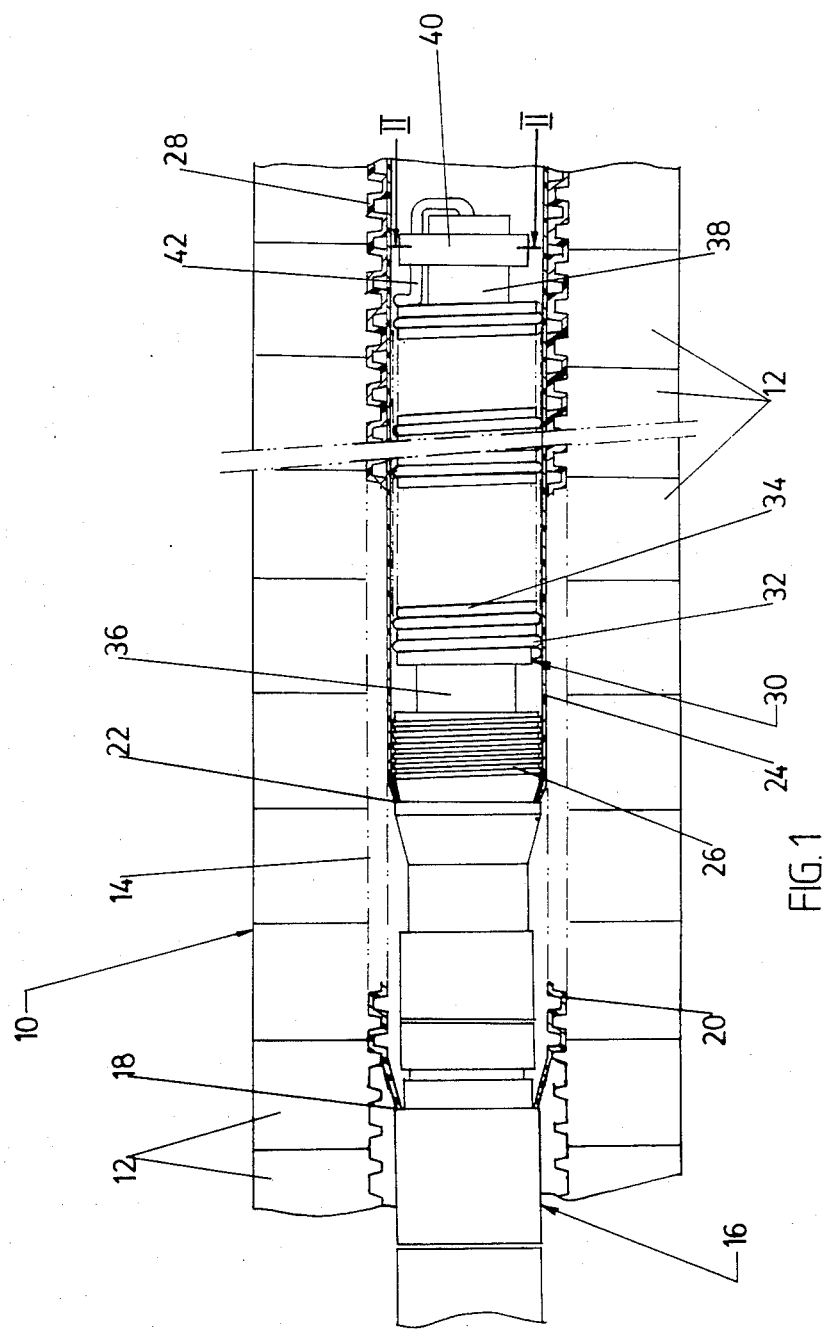
FIG. 1 is a partially sectional view of an apparatus according to the present invention.
Figure 2:
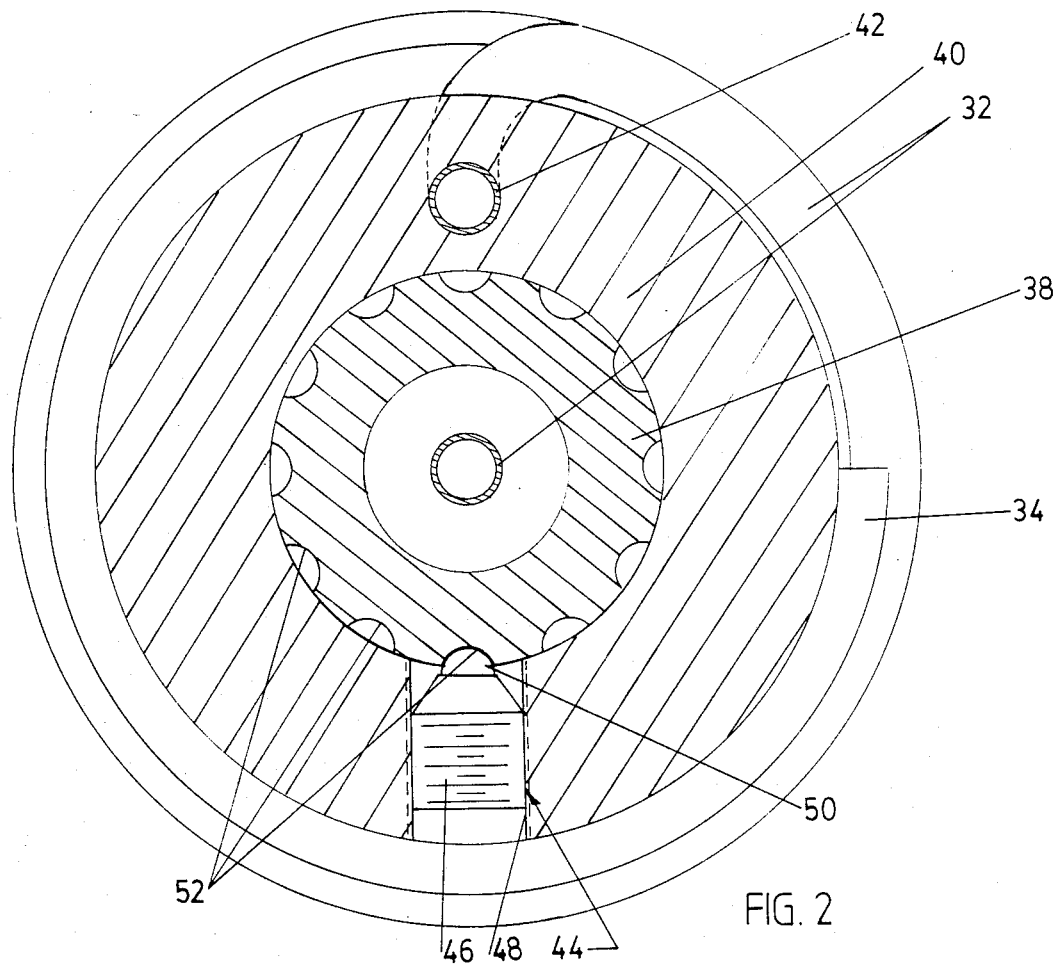
FIG. 2 is a view along line II—II of FIG. 1

Referring to the accompanying drawings and particularly to FIGS. 1 and 2, there is illustrated a travelling mold 10 of the re-circulating bypartite type employed in those machines known as corrugators. The mold is formed of two sets of moldblocks 12 that travel on respective endless paths and co-operate along a forward run of each path to define a corrugated mold cavity 14.

A die 16 extends into the upstream end of the cavity 14. It has an upstream die gap 18 through which a tube 20 of thermoplastic material is extended. The tube 20 is molded into the corrugated cavity using either internal air pressure or an external vacuum applied through appropriate openings formed in the moldblocks 12. The die 16 also has a downstream die gap 22 for extruding a second tube 24 of thermoplastic material into the first tube and over a cold plug 26 which presses the inner tube against the outer to fuse the two tubes into a double walled pipe 28 with an outer corrugated wall and an inner smooth wall. A machine of this type and its operation are described in somewhat greater detail in Canadian Patent Application No. 405,321 referred to above.

Downstream of the cold plug 26, the mold cavity 14 contains a calibrator 30 for controlling the final configuration of the inner wall and for cooling the formed pipe. The calibrator includes a tube 32 wound into a helical configuration on a carrier 34. The carrier 34 is connected to the die by a die extension 36 extending downstream from the cold plug 26 at the downstream end of the carrier 34 is a small diameter core extension 38 that carries a bushing 40. A downstream end section 42 of the tube 32 extends through an axial bore in the bushing 40 as shown in FIGS. 1 and 2 and then through a U-shaped bend to extend along the hollow centre of the carrier 34. At its upstream end, the tube 32 extends through a radial bore (not shown) in the carrier 34. The two ends of the tube 32 are connected to coolant lines running along the centre of the die 16 and thench to an external source of fluid coolant.

As illustrated most particularly in FIG. 2, the bushing 40 is connected to the core extension 38 by a ball detent 44. The detent has a carrier 46 that is threaded into a radial bore 48 in the bushing 40, and a ball 50 that projects from the inner end of the carrier 46 to engage any one of several concave sockets 52 spaced around the carrier extension 38.

The ball 50 may be pushed into the carrier 46 against the biasing force of a spring (not shown) contained within the carrier. When sufficient torque is applied to the bushing, the ball is cammed into the carrier, out of the socket 52 that it is engaging, so that the bushing may be rotated to a new position where it will be held in place by engagement of the ball 50 in another of the sockets 52. This rotation of the bushing 40 will either wind up or unwind the coiled part of the tube 32 to contract or expand the coil and allow adjustment of its diameter.

Figure 3:
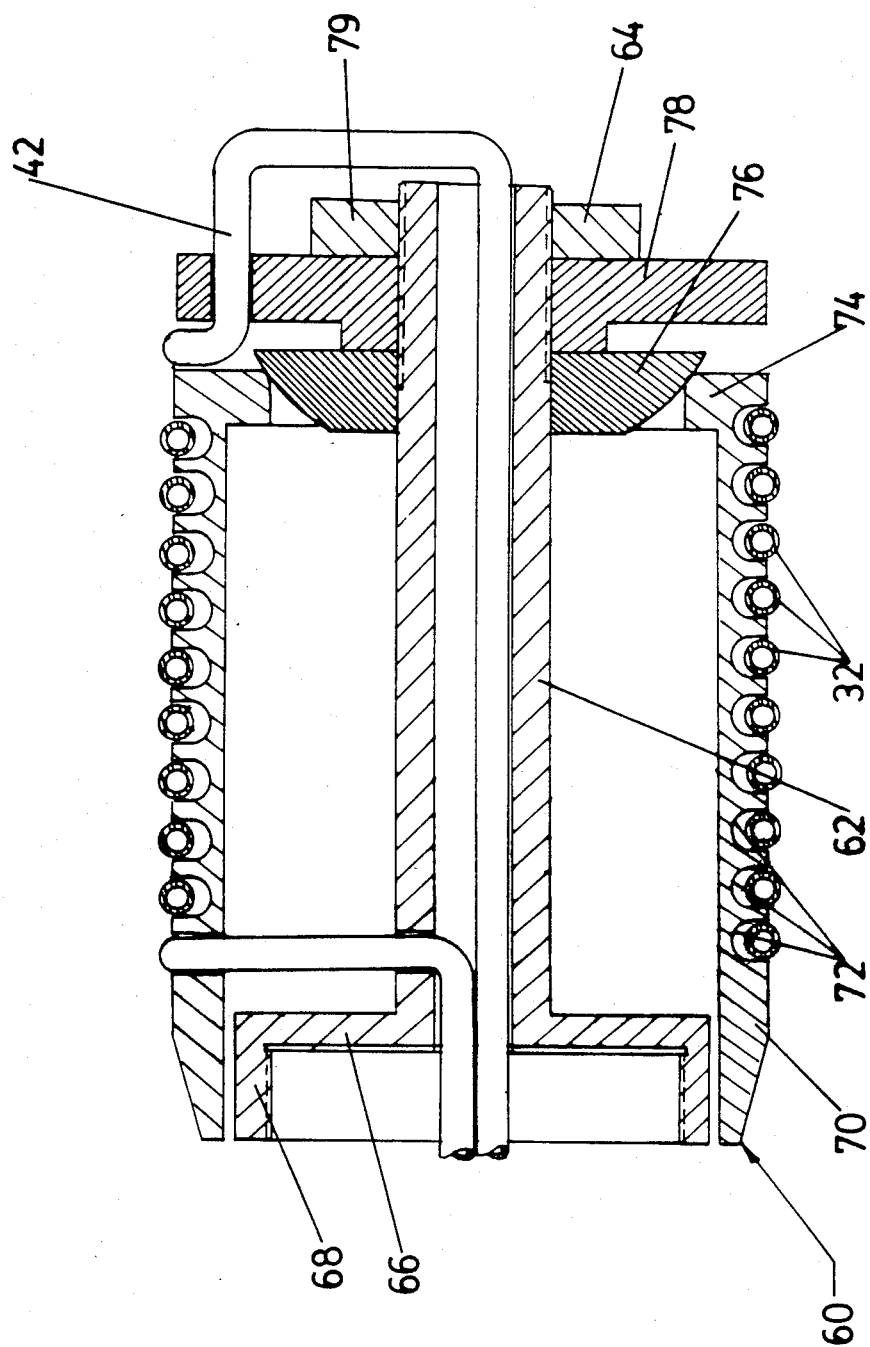
FIG. 3 is a longitudinal section of a self-centering calibrator carrier.

Referring to FIG. 3, this drawing illustrates a calibrator with a self-centering carrier 60. The carrier includes a central core tube 62 with an external thread 64 at the downstream end and a circular flange 66 adjacent the upstream end. The flange 66 carries an internally threaded cylindrical flange 68 that is used to secure the core tube to the die 16. A support cylinder 70 surrounds the core tube 62. A helical groove 72 in the outer surface of the cylinder carries the coil of tube 32. An annular flange 74 at the downstream end of the support cylinder 70 engages the convex upstream face of a plug 76 mounted on the core tube 62. The flange 74 rides on the convex face of the plug 76 to center the cylinder 70 on the plug.

The upstream end of tube 32 extends through radial bores in the cylinder 70 and the core tube 62. At the downstream end, the end section 42 of tube 32 extends through an axial bore in a bushing 78 that is threaded onto the downstream end of tube 62. The end section 42 of the tube 32 is then formed into a U-shaped bend and passes through the center of core tube 62.

The two ends of the tube 32 extend through the core tube 62 to the upstream end where they are connected to appropriate coolant lines passing through the centre of die 16.

With this embodiment, the support cylinder 70 is dynamically centered inside the pipe by engagement of the convex surface of the plug 76 with the annular flange 74. The diameter of the helical core formed by the tube 32 may be adjusted by rotating the bushing 78 on the core tube 62. A locknut 79 fixes the bushing 78 in place.

Figure 5:
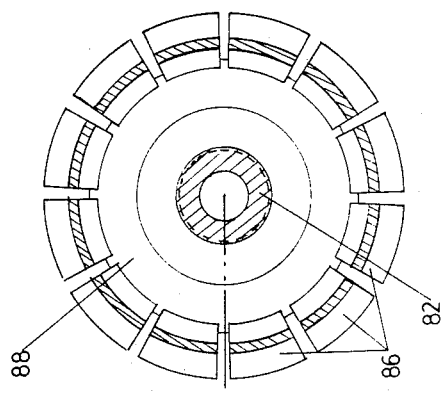
FIG. 5 is a view along line V—V of FIG. 4
Figure 4:
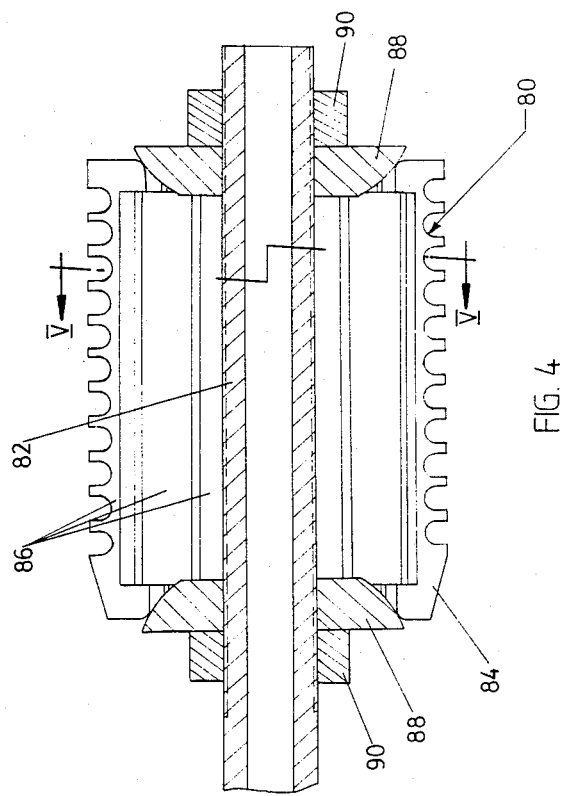
FIG. 4 is a longitudinal section of an adjustable diameter carrier.

FIGS. 4 and 5 illustrate a calibrator carrier that is expandable and contractable to adjust the diameter of the coils of tube 32. The carrier 80 has a core tube 82 that is threaded over a substantial length adjacent its downstream end. Surrounding the core tube 82 is a support cylinder 84 divided into plural axial segments 86. At the end of the support cylinder, the segments ride on the tapered faces of respective tapered plugs 88 threaded onto the core tube 82. Counter nuts 90 lock the plugs 88 in place on the core tube. With the tube 32 wound on the support cylinder, the resilience of the tube coils retains the segments 86 in place on the plugs 88. If the plugs are brought towards one another, the segments ride along their tapered faces to expand the support cylinder. Conversely, the diameter may be reduced by separating the plugs 88.

While certain embodiments of the present invention have been described in the foregoing, it is to be understood that other embodiments are possible within the scope of the invention. It is, for example, possible to use two or more calibrators in tandem along the mold cavity. Alternative forms of adjuster may be employed, for example a spiral cam system carrying the segments of the expandable support core of FIGS. 4 and 5. In some embodiments, where the configuration of the die permits, a control rod or wire may extend through the centre of the die and ultimately to the exterior through a spider or the back of the die so as to enable coil diameter adjustment during operation of the corrugator.

It is further to be understood that the present invention is not only applicable to corrugators having recirculating bipartite molds but in general to any apparatus having a travelling mold cavity.

I claim:

1. In an apparatus for manufacturing thermoplastic pipes, a calibrator comprising an elongate carrier supporting a helical spring having a transitional deformation, said helical spring further having one end fixed to said carrier and an opposite end attached to a rotatable element so as to vary and fix the diameter of said spring by means of twisting said spring about said carrier and converting said transitional deformation of said spring into a radial deformation.

* * * * *